United States Patent
Mizukawa et al.

(10) Patent No.: US 7,882,720 B2
(45) Date of Patent: Feb. 8, 2011

(54) AUTOMATIC BENDING MACHINE FOR STEEL RULE PUNCHING DIE AND THE STEEL RULE PUNCHING DIE

(75) Inventors: Suehiro Mizukawa, Osaka (JP); Toshinaga Urabe, Kanagawa (JP)

(73) Assignee: Suehiro Mizukawa, Settsu-shi, Osaka (JP)

( * ) Notice: Subject to any disclaimer, the term of this patent is extended or adjusted under 35 U.S.C. 154(b) by 623 days.

(21) Appl. No.: 11/885,187

(22) PCT Filed: Mar. 14, 2005

(86) PCT No.: PCT/JP2005/004422

§ 371 (c)(1), (2), (4) Date: Aug. 28, 2007

(87) PCT Pub. No.: WO2006/097984

PCT Pub. Date: Sep. 21, 2006

(65) Prior Publication Data

US 2008/0156064 A1    Jul. 3, 2008

(51) Int. Cl.
 *B21D 5/16* (2006.01)
 *B21D 7/022* (2006.01)
 *B23D 15/10* (2006.01)
 *B23P 15/40* (2006.01)

(52) U.S. Cl. .............. 72/307; 72/310; 493/61; 493/354; 493/363; 493/372; 76/107.8; 83/685; 83/691; 83/697; 83/698.71; 83/699.11

(58) Field of Classification Search ............ 72/307, 72/316, 317, 319, 322, 379.2, 388, 428, 462, 72/467, 468; 493/61, 354, 363, 372; 83/16, 83/123, 170, 171, 182, 685, 691, 697, 698.71, 83/699.11; 76/107.8
See application file for complete search history.

(56) References Cited

U.S. PATENT DOCUMENTS

| | | | | | |
|---|---|---|---|---|---|
| 4,773,284 | A | * | 9/1988 | Archer et al. ............ | 76/4 |
| 5,461,893 | A | * | 10/1995 | Tyler .................... | 72/16.2 |
| 5,463,890 | A | * | 11/1995 | Tachibana ............... | 72/294 |
| 5,787,750 | A | * | 8/1998 | Song .................... | 72/294 |
| 5,870,919 | A | * | 2/1999 | Song .................... | 72/294 |
| 6,128,940 | A | * | 10/2000 | Song .................... | 72/294 |

(Continued)

FOREIGN PATENT DOCUMENTS

JP    2000 263498    9/2000

(Continued)

*Primary Examiner*—David B Jones
(74) *Attorney, Agent, or Firm*—Bacon & Thomas, PLLC

(57) ABSTRACT

An automatic bending machine produces a steel rule punching die to be used for forming predetermined notch lines or fold lines in a paper strip, a sheet, a board member, or the like in production of a paper container or a corrugated box. The automatic bending machine has a bending tool which bends a band blade into a predetermined shape. In the machine, a diamond grinder which is laterally and vertically moved by a computer control is disposed in front of the bending tool. When the bending tool is combined with the diamond grinder, bending of the band blade, linear cutting of the both ends, nicking of a blade edge, bridging (notching) of a blade bottom, and broaching (slotting) of a blade side wall are enabled.

5 Claims, 17 Drawing Sheets

U.S. PATENT DOCUMENTS

| | | | |
|---|---|---|---|
| 6,308,551 B1 * | 10/2001 | Park | 72/307 |
| 6,324,953 B1 * | 12/2001 | Park | 83/554 |
| 6,367,302 B1 * | 4/2002 | Park | 72/294 |
| 6,422,052 B2 * | 7/2002 | Park | 72/307 |
| 2001/0039821 A1 | 11/2001 | Park | |

FOREIGN PATENT DOCUMENTS

| | | |
|---|---|---|
| JP | 2000 288991 | 10/2000 |
| JP | 2001 219397 | 8/2001 |
| JP | 2004 160656 | 6/2004 |

* cited by examiner

AUTOMATIC BENDING MACHINE FOR STEEL RULE PUNCHING DIE AND THE STEEL RULE PUNCHING DIE

TECHNICAL FIELD

The present invention relates to an automatic bending machine which produces a steel rule punching die to be used for forming predetermined notch lines or fold lines in a paper strip, a sheet, a board member, or the like in production of a paper container or a corrugated box, and also to a steel rule punching die, and more particularly to an automatic bending machine which automatically performs bending, cutting, or the like on a band blade constituting a steel rule punching die, and also to a steel rule punching die.

BACKGROUND ART

In recent years, starting with an automatic bending machine for a steel rule punching die (trade name: BBS-101) which was released in 1988 ahead of the world by MIZUKAWA Suehiro, the inventor of the present invention, such an automatic bending machine has been amazingly advanced. There is an automatic bending machine which performs processes of cutting and bending a band blade constituting a steel rule punching die (for example, see Patent References 1 and 2).

Recently, also an automatic bending machine which, in addition to processes of cutting and bending a band blade, can perform bridging of a blade bottom, nicking of a blade edge, broaching of a blade side wall, and the like has been proposed (for example, see Patent References 3 and 4).

Patent Reference 1: U.S. Pat. No. 5,749,276
Patent Reference 2: U.S. Pat. No. 5,787,750
Patent Reference 3: Japanese Patent Application Laying-Open No. 11-347828
Patent Reference 4: Japanese Patent Application Laying-Open No. 2001-314932

DISCLOSURE OF THE INVENTION

Problems that the Invention is to Solve

In the automatic bending machine which, in addition to processes of cutting and bending a band blade, can perform bridging of a blade bottom, nicking of a blade edge, broaching (slotting) of a blade side wall, and the like, however, apparatuses respectively having desired functions among those for bridging, nicking, and the like are gradually added in series with a line of feeding a band blade, whereby they are combined into one machine. Consequently, there arise problems in that the price is inevitably increased in accordance with portions of added apparatuses, and that the whole machine is unavoidably enlarged.

When, as a steel rule punching die, a receiving band blade 132 and a butting band blade 131 are perpendicularly butt-joined to each other as shown in FIG. 17, a miter 121a is processed in a blade edge 121 of the butting band blade 131. The projection amount of the miter 121a is a half of the thickness of the receiving band blade 132. When the receiving band blade 132 has 2 points (thickness of 0.72 mm), the projection amount of the miter 121a is 0.36 mm. In the miter-joined steel rule punching die, however, there is a possibility that the miter 121a is broken off by a pressure applied by a punching machine. When the miter 121a is broken off, a gap of 0.36 mm is produced between the receiving band blade 132 and the butting band blade 131. Then, the punching blank becomes defective. Therefore, the situation is that the operator of the punching machine sometimes stops the machine to check the blade.

FIG. 16 shows a state where a laser cut groove 61 is cut in a plywood sheet 6 by a laser of a steel rule punching die. Bridges 62 which are not cut prevent the plywood sheet 6 from being broken into pieces. Therefore, bridges 62 or notches must be disposed in corresponding places of the band blade 12. The band blade 12 which has been bent by an automatic bending machine is hammered into the laser cut groove 61 by a wooden hammer. The actual example which is cut in the punching die is a popular inverted sack box. In this example also, the number of miter-joined places is very large. Even when a broken-off portion is formed in a place where a pasted length in a place B in the example butts against an adjacent blank, this may be allowed because the portion is hidden inside of an article as a result of pasting. When a miter of a cut 100 of an insertion portion in a place A or a flap 101 in a place D is broken off, however, there is a problem in that a filling machine is stopped.

The invention has been conducted in order to solve the above-discussed problems. It is an object of the invention to provide an automatic bending machine for a steel rule punching die in which a bending tool and a diamond grinder that is laterally and vertically moved are combined with each other, thereby enabling bending of a band blade, linear cutting of both ends, nicking of a blade edge, bridging (notching) of a blade bottom, and broaching (slotting) of a blade side wall.

The steel rule punching die of the invention provides a punching die in which a miter process is eliminated, and it is not necessary to worry about braking of a miter, and which is highly reliable.

MEANS FOR SOLVING THE PROBLEMS

The automatic bending machine for a steel rule punching die of the invention is an automatic bending machine comprising a bending tool (1) which bends a band blade (12) into a predetermined shape, wherein a diamond grinder (20) which is laterally and vertically moved by a computer control is disposed in front of the bending tool (1).

In a preferred mode, the automatic bending machine for a steel rule punching die of the invention may comprise a band-blade support device (4) which, when the band blade (12) is processed, is raised to hold the band blade (12), in front of the bending tool (1). Alternatively, a section shape of an outer periphery of the diamond grinder (20) may be formed into a dovetail shape having a linear portion (200) and an inclined portion (201) which is formed on an inner-diameter side end of the linear portion.

The steel rule punching die of the invention comprises a groove (122) which is cut in a side wall of a receiving band blade (132), and a notch (133) in a lower portion of the groove, and an end portion (131a) of a butting band blade (131) comprising: in a tip end, the end portion (131a) having a height that is substantially equal to a thickness of a plywood sheet (6); and a blade inclined end (16) is entered into the lower notch (133) of the groove (122).

Furthermore, the steel rule punching die of the invention is a steel rule punching die in which an end portion of a butting band blade (131) butts against a groove (122) which is cut in a side wall of a receiving band blade (132) to be joined at a predetermined inclination angle, wherein an end portion of the butting band blade (131) is formed into a shape cut in a Z-like section shape having a groove bottom face (161C), a groove side face (161D) which intersects with one end of the groove bottom face (161C), and a projection end face (161E) which intersects with another end face of the groove bottom face (161C).

EFFECTS OF THE INVENTION

In the invention, as the above-described configuration, the invention comprises the diamond grinder (20) in front of the bending tool (1) so as to be movable laterally and vertically. When the diamond grinder (20) is moved laterally and vertically with respect to the band blade (12), therefore, linear cutting of both ends of the band blade (12), nicking of a blade edge, bridging (notching) of a blade bottom, and broaching (slotting) of a blade side wall are enabled. These processes are enabled by the single diamond grinder, whereby the whole automatic bending machine can be reduced in cost, miniaturized, and compactified.

When the machine comprises the band-blade support device (4) which, when the band blade (12) is processed, is raised to hold the band blade (12), in front of the bending tool (1), it is possible to prevent the band blade from vibrating. Therefore, the process accuracy can be improved.

When the section shape of the outer periphery of the diamond grinder (20) is formed into a dovetail shape having the linear portion (200) and the inclined portion (201), the blade inclined end (16) is enabled by the inclined portion (201) to be easily formed in an end of the band blade (12).

The steel rule punching die of the invention comprises the groove (122) which is cut in the side wall of the receiving band blade (132), and the notch (133) in a lower portion of the groove, and is configured so that the end portion (131a) of the butting band blade (131) comprising; in the tip end, the end portion (131a) having the height that is substantially equal to the thickness of the plywood sheet (6); and the blade inclined end (16) is entered into the lower notch (133) of the groove (122). Unlike a punching die due to the miter process, the problem of a broken miter is eliminated. Also a problem in that, during a punching work, paper dust is trapped in a joint portion between the blades (132, 131) is eliminated.

The steel rule punching die of the invention is a steel rule punching die in which the end portion of the butting band blade (131) butts against the groove (122) which is cut in the side wall of the receiving band blade (132) to be joined at a predetermined inclination angle, wherein the end portion of the butting band blade (131) is formed into a shape cut in a Z-like section shape having the groove bottom face (161C), the groove side face (161D) which intersects with one end of the groove bottom face (161C), and the projection end face (161E) which intersects with the other end face of the groove bottom face (161C). By the usual flat diamond grinder (20), the end portion of the butting band blade (131) which is joined at an inclination angle with the receiving band blade (132) can be processed. When the width of the groove bottom face (161C) is changed, the joining is enabled in the line contact state also in a case where the end portion of the butting band blade (131) is joined in a line contact state to the receiving band blade (132) at any inclination joint. angle.

Preferred embodiments of the invention will be described with reference to the drawings.

Figure 1:
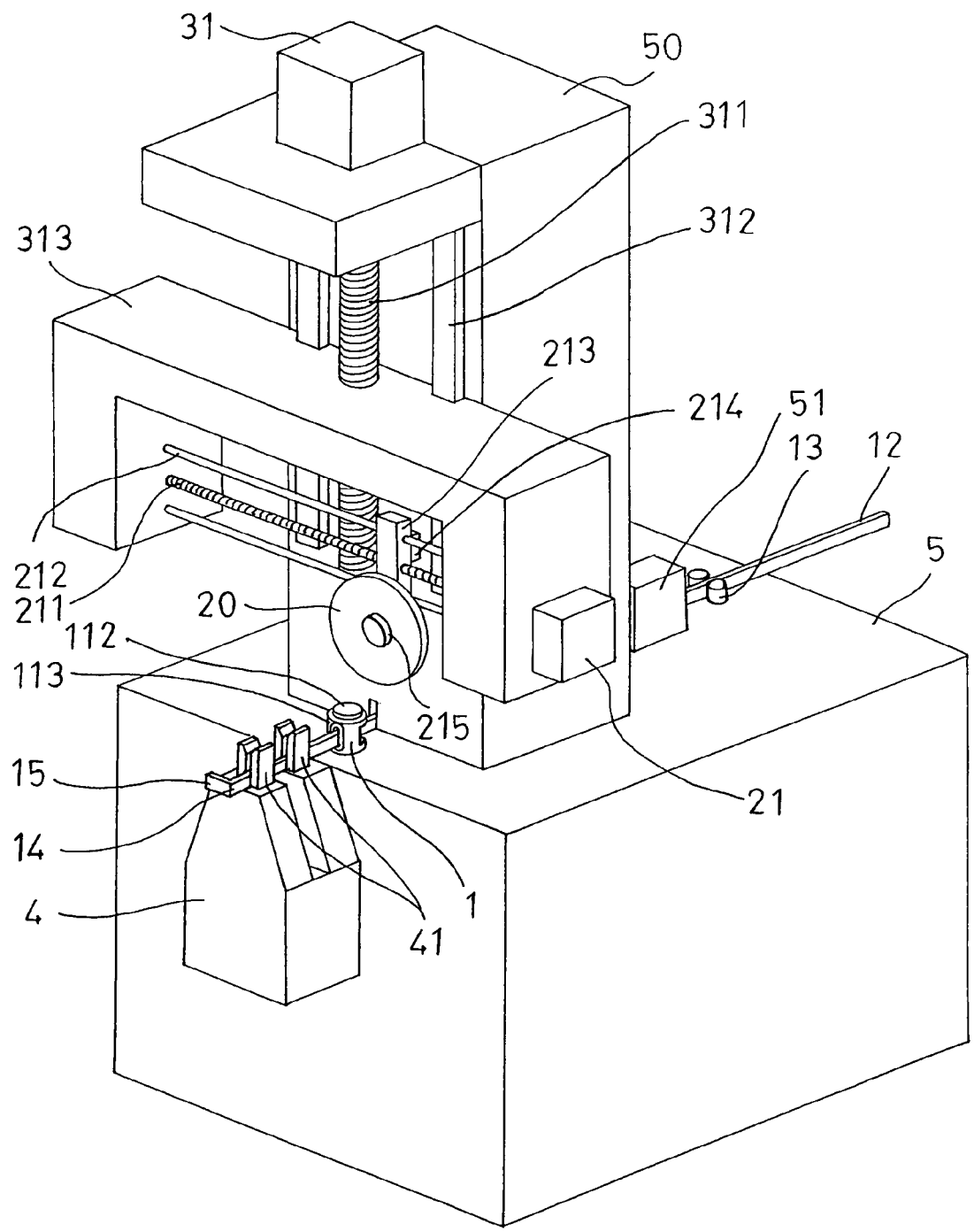
FIG. 1 is a perspective view of the automatic bending machine of the invention.
Figure 2:
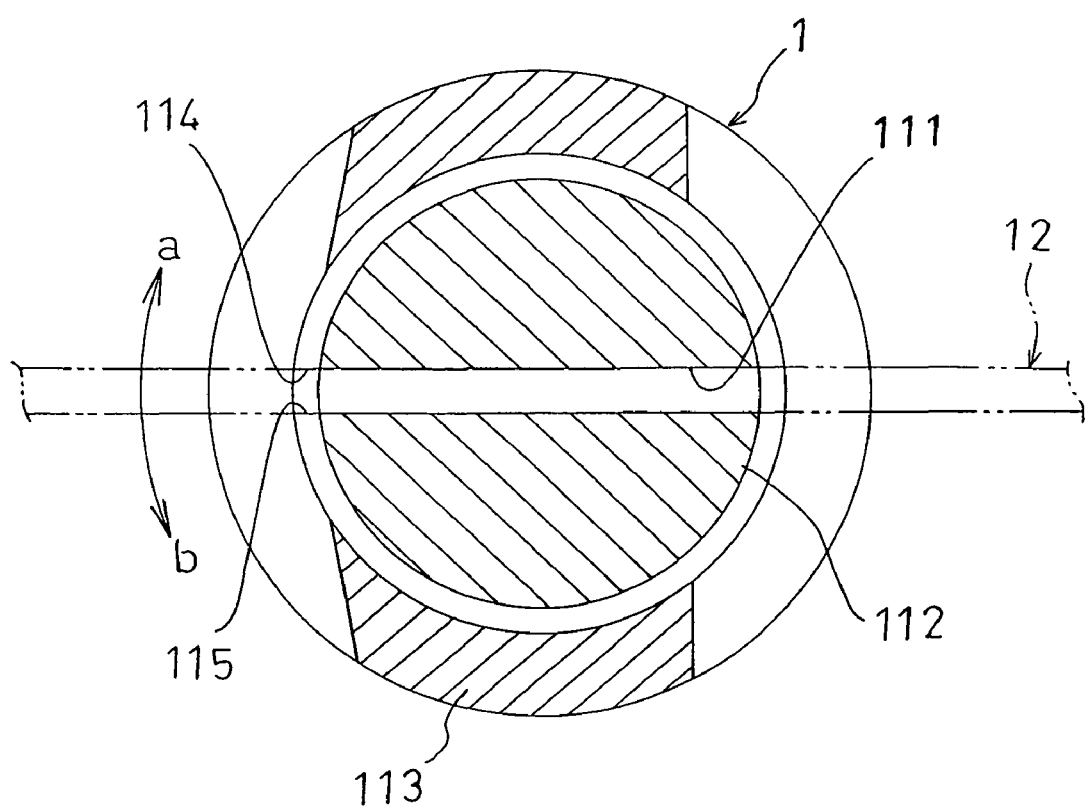
FIG. 2 is a cross section plan view of a bending tool of the automatic bending machine.

FIG. 1 is a perspective view of the automatic bending machine for a steel rule punching die according to the invention. The automatic bending machine comprises a bending tool 1 having the same mechanism as the bending tool of the conventional automatic bending machine. As shown in the cross section plan view of FIG. 2, for example, the bending tool 1 is configured by: a bending nozzle 112 having a slit 111; and a rotary member 113 which laterally pushes and bends a band blade 12 passed through the slit 111 of the bending nozzle 112. In the figure, the arrows a, b indicate the rotation directions of the rotary member 113. In the bending tool 1, namely, the rotary member 113 is rotated in the direction of the arrow a or b with respect to the band blade 12 projected from the slit 111 of the bending nozzle 112. The band blade 12 which is laterally pushed by the rotary member 113 butts against one of opening edges 114, 115 of the bending nozzle 112, to be bent. The bending angle of the band blade 12 is determined by the rotation amount of the rotary member 113, and the bent place of the band blade 12 is determined by the feeding amount of the band blade 12 from the slit 111.

A two-dimensional control apparatus which enables a diamond grinder 20 that is rotated at high speed to be movable laterally and vertically is disposed in front of the bending tool 1.

Referring to FIG. 1, the band blade 12 is forward fed from a rear portion of the automatic bending machine by a feeding roller 13. The band blade 12 which is passed through the slit 111 of the bending nozzle 112 of the bending tool 1 is bent to a predetermined angle by the rotation of the rotary member 113. In the case where the band blade 12 is to be bent at a right angle 14, the band blade is bent by one swing of the bending tool 1. In the case where the band blade 12 is to be arcuately bent, the band blade is arcuately bent by "poly line" in such a manner that the band blade is fed by 0.5 to 1.0 mm by the feeding roller 13, the bending tool 1 strikes the band blade 12 to a predetermined angle which is controlled by a computer, and, when the band blade is then fed by 0.5 to 1.0 mm by the feeding roller 13, the band blade is struck one time. A controller in the invention is four- or five-axis controlled.

Processes other than bending of the band blade 12, namely, linear cutting of the both ends of the band blade 12, nicking of the blade edge, bridging (notching) of the blade bottom, and broaching (slotting) of a blade side wall are attained by the diamond grinder 20 which is movable laterally and vertically.

Next, the process sequence of the automatic bending machine of the invention will be described. Referring to FIG. 1, when the tip end 15 of the band blade 12 is passed through the bending nozzle 112 of the bending tool 1, a Y-axis motor 21 for lateral movement is driven, so that a Y-axis screw 211 is rotated and a grinder housing 213 is laterally moved along a Y-axis rail 212. A high-speed grinder motor 214 is disposed in back of the grinder housing 213. The diamond grinder 20 is rotated via a shaft 215 by the motor 214. When the diamond grinder 20 reaches a predetermined position, a Z-axis housing 313 which houses the Y-axis motor 21, the Y-axis screw 211, and the Y-axis rail 212 is lowered along a Z-axis rail 312 as result of rotation of a Z-axis screw 311 which is driven by a Z-axis motor 31. As a result, the diamond grinder 20 cuts the band blade 12 to form the tip end 15 of the band blade.

The Z-axis housing 313 is supported by a tower 50.

The tower 50 is fixed to a machine bed 5. In the example, the Z-axis housing 313 is lowered from the upper side to the lower side to perform the process. However, the installation position of the facility is not restricted to this. For example, it is fixed to the tip end of the machine bed 5, and it is raised conversely from the lower side to the upper side to perform the process.

The diamond grinder 20 is appropriately rotated at the speed of 20,000 rpm. However, the cutting speed depends on the diameter. In the sequence of cutting the band blade 12, preferably, the movement is performed from the blade edge of the band blade 12 toward the blade bottom. However, the movement is not restricted to this.

When the process is started at a position close to the final position of the previous process, it is possible to reduce the moving time.

Figure 3:
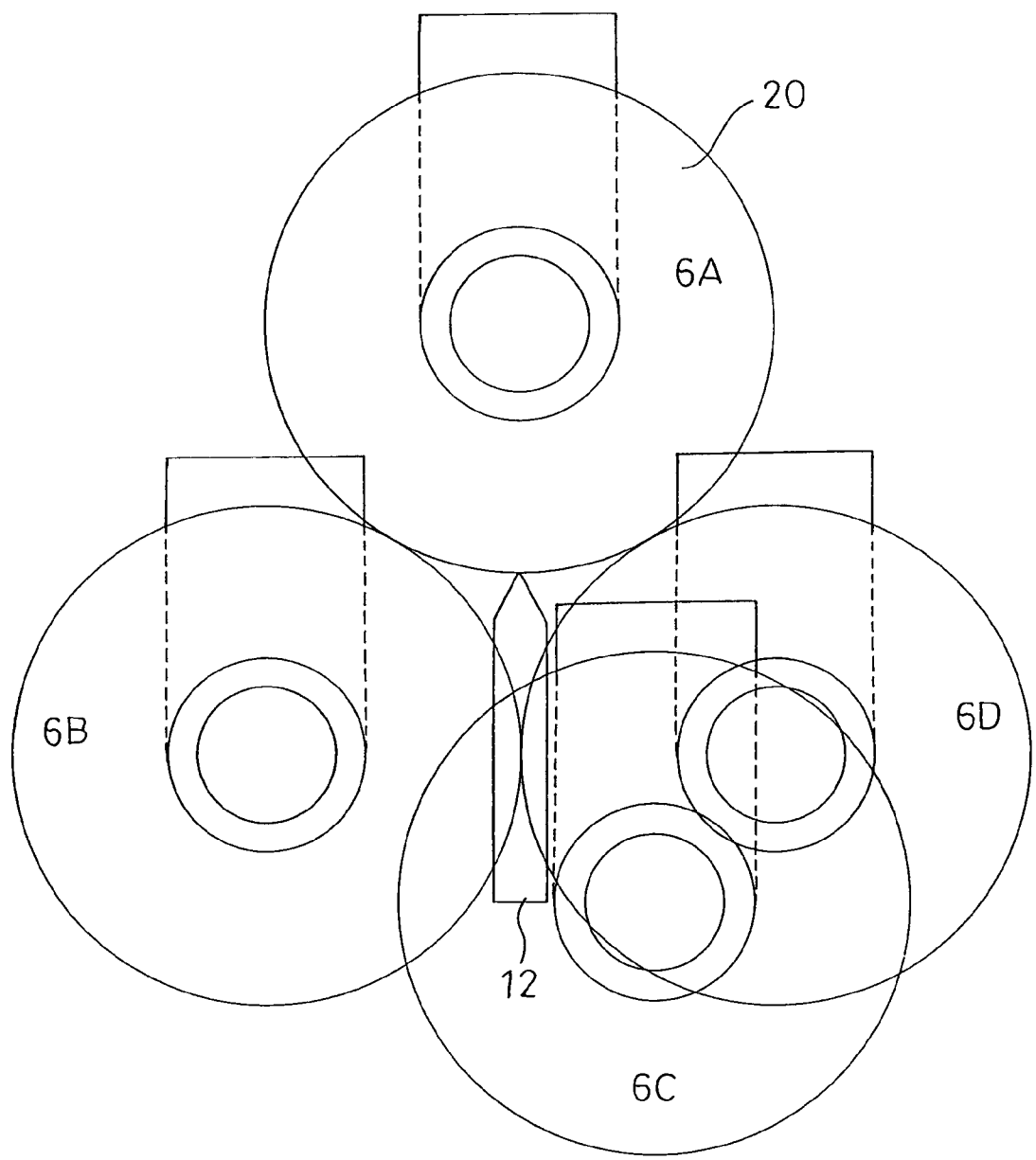
FIG. 3 is a front view showing a process position of a diamong grinder of the invention.
Figure 4:
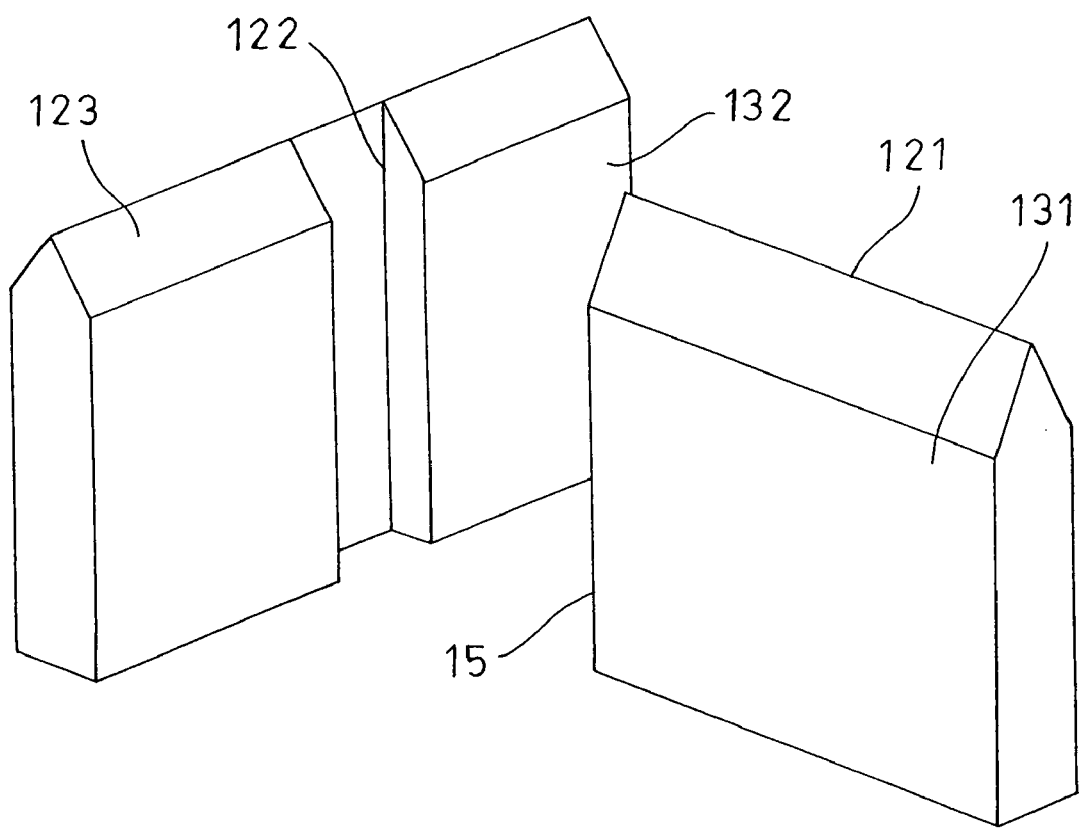
FIG. 4 is a perspective view showing a receiving band blade in which a groove is formed in a side face, and a butting band blade which is to be joined to the groove.

FIG. 3 shows relative positional relationships between the diamond grinder 20 and the band blade 12. In order to improve the understanding, the figure is drawn so that the dimensions of the band blade 12 are increased and the diameter of the diamond grinder 20 is reduced. In the figure, when the diamond grinder 20 at the position of 6A is lowered, cutting or nicking of the band blade 12 is enabled. The positions of 6B and 6D show a position where a groove 122 is cut in a side wall of a receiving band blade 132 to a depth which is equal to a half of the thickness of the blade as shown in FIG. 4. The position of 6C shows a process position for bridging of the blade bottom of the band blade 12, and the process position of a notch 133 of the blade bottom of FIG. 9(c).

When the band blade 12 has 2 points, the thickness of the diamond grinder 20 may be 1 mm. When the width is 1 mm, the width received by 2 points or the thickness of 0.72 mm can be cut by a single process.

Figure 9A:
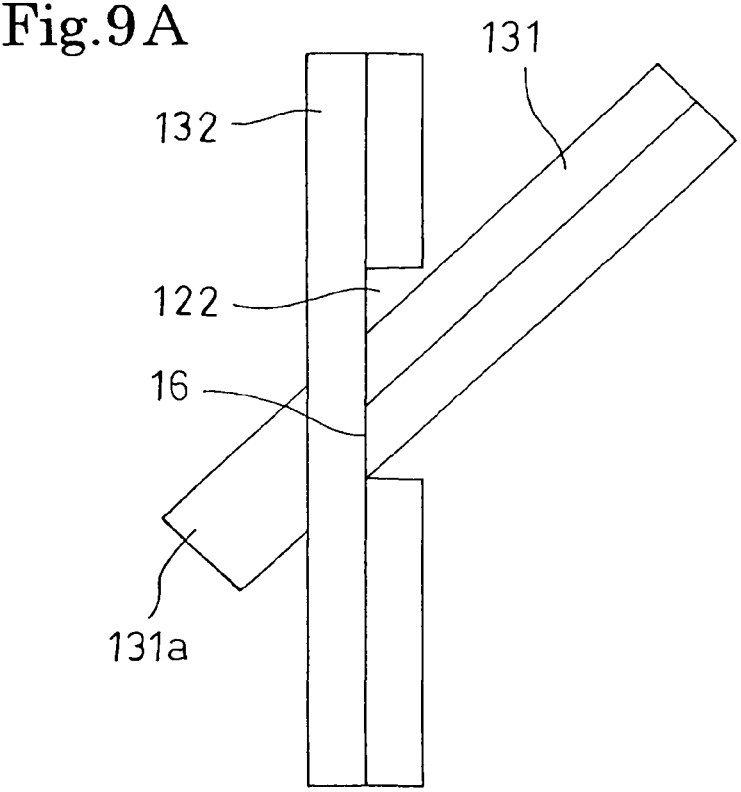
FIG. 9(a) is a plane view of a punching die of the invention in which a receiving band blade and a butting band blade are combined with each other.

In the case where the groove 122 is cut in a side wall of the receiving band blade 132 to which a butting band blade 131 is to be joined at an inclination angle that is not 90 deg. as shown in FIG. 9(a), for example, the width of the groove 122 or 1 mm is insufficient. In this case, the process is performed while the band blade 12 is advanced or retracted by the feeding roller 13, so that the groove width is increased. In the case where 3-point (thickness of 1.08 mm) or 4-point (thickness of 1.44 mm) blade is to be processed by the diamond grinder 20 having the width of 1 mm, similarly, a process in which the grinder is vertically lowered and raised two or more times is required. Preferably, the diameter of the diamond grinder 20 is 127 mm or 64 mm. In the diamond grinder 20, the base is made of aluminum, and diamond powder is bonded to the surface of the base.

When the process of cutting the tip end 15 of the band blade 12 is ended, the Z-axis housing 313 is raised, and the feeding roller 13 is reversely rotated, whereby the band blade 12 is moved to the position of the bending nozzle 112 of the bending tool 1 so as to be bent at the right angle 14. Then, the rotary member 113 of the bending tool 1 is rotated, and the band blade 12 is perpendicularly bent. When the feeding roller 13 feeds the band blade 12 to a predetermined position, a receiving tool 41 of a band-blade support device 4 which will be described later in detail is raised to stop the vibration of the band blade 12, whereby the band blade 12 is surely held so as to ensure the accuracy of the Y-axis process depth of the diamond grinder 20.

The process of cutting the rear end of the bent band blade 12 can be performed by repeating the same operation as the sequence of cutting the tip end 15 of the blade. The processes of cutting the both ends or the tip and rear ends of the band blade 12 are performed as described above. In the processes, when the cutting is performed so that the cut end of the blade bottom is inside of that of the blade edge 121, the joining point in joining of the ends of the blade edge 121 is not opened. Namely, the cutting is performed so that the total length of the blade bottom is shorter by 0.2 mm than that of the blade edge 121. In this case, when the Z-axis housing 313 is moved from the lower side to the upper side, the feeding roller 13 may be reversely rotated so that an inclination of 0.1 mm is formed in the cut end of the tip end of the band blade 12. The rear end of the band blade 12 is conversely fed out. This process procedure is realized by incorporating it into the computer as a sub-process program.

Figure 5:
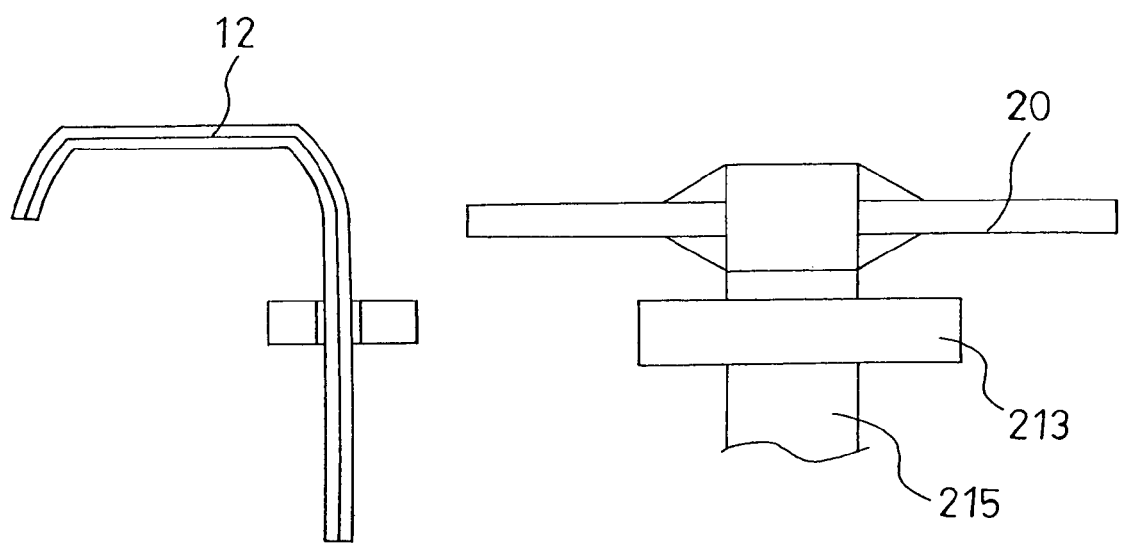
FIG. 5 is a plan view showing a process example of a terminal end of a band blade of the invention.
Figure 6A:
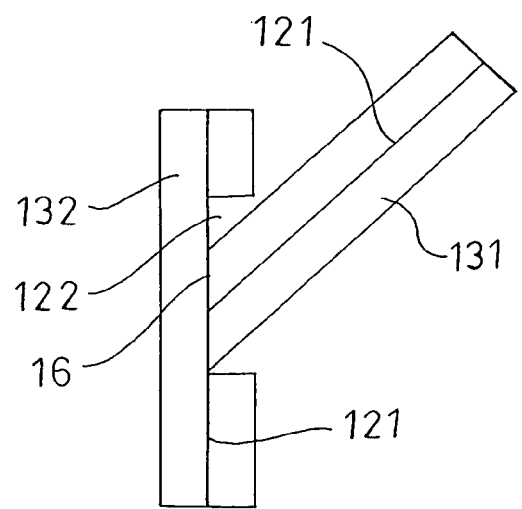
FIGS. 6(a) and 6(b) are plan views showing joining of band blades in a place B of FIG. 1.
Figure 6B:
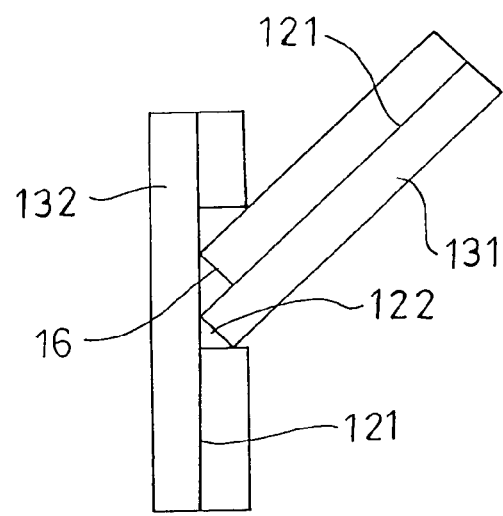
Figure 7A:
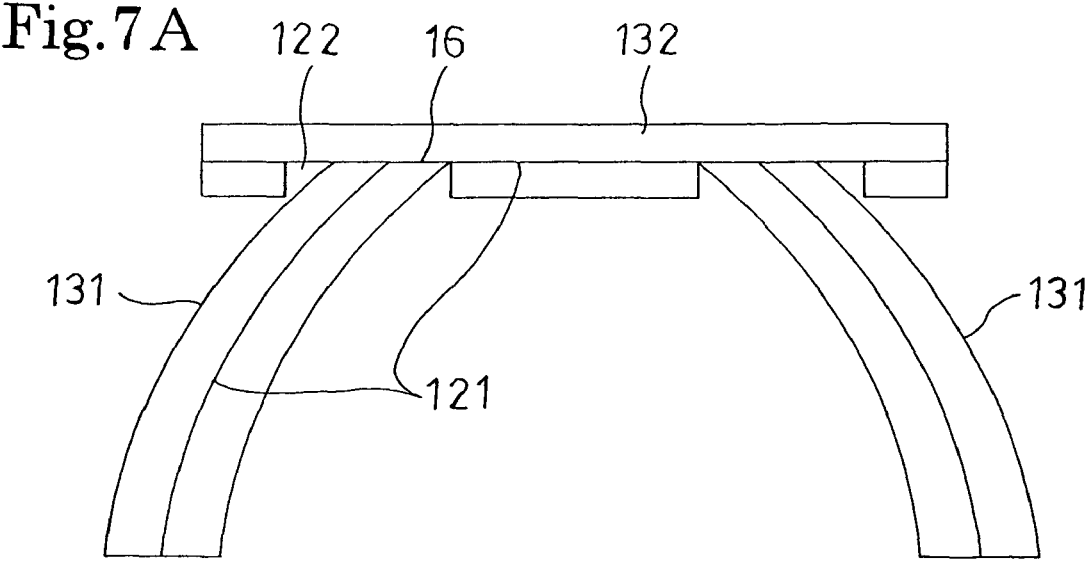
FIGS. 7(a) and 7(b) are plan views showing joining of band blades in a place C of FIG. 1.
Figure 7B:
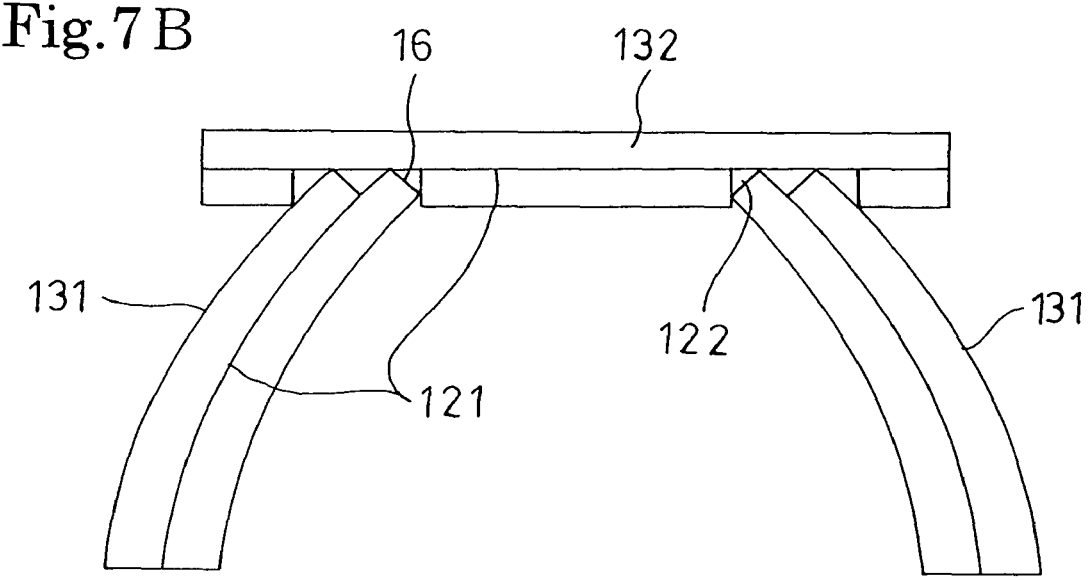
Figure 16:
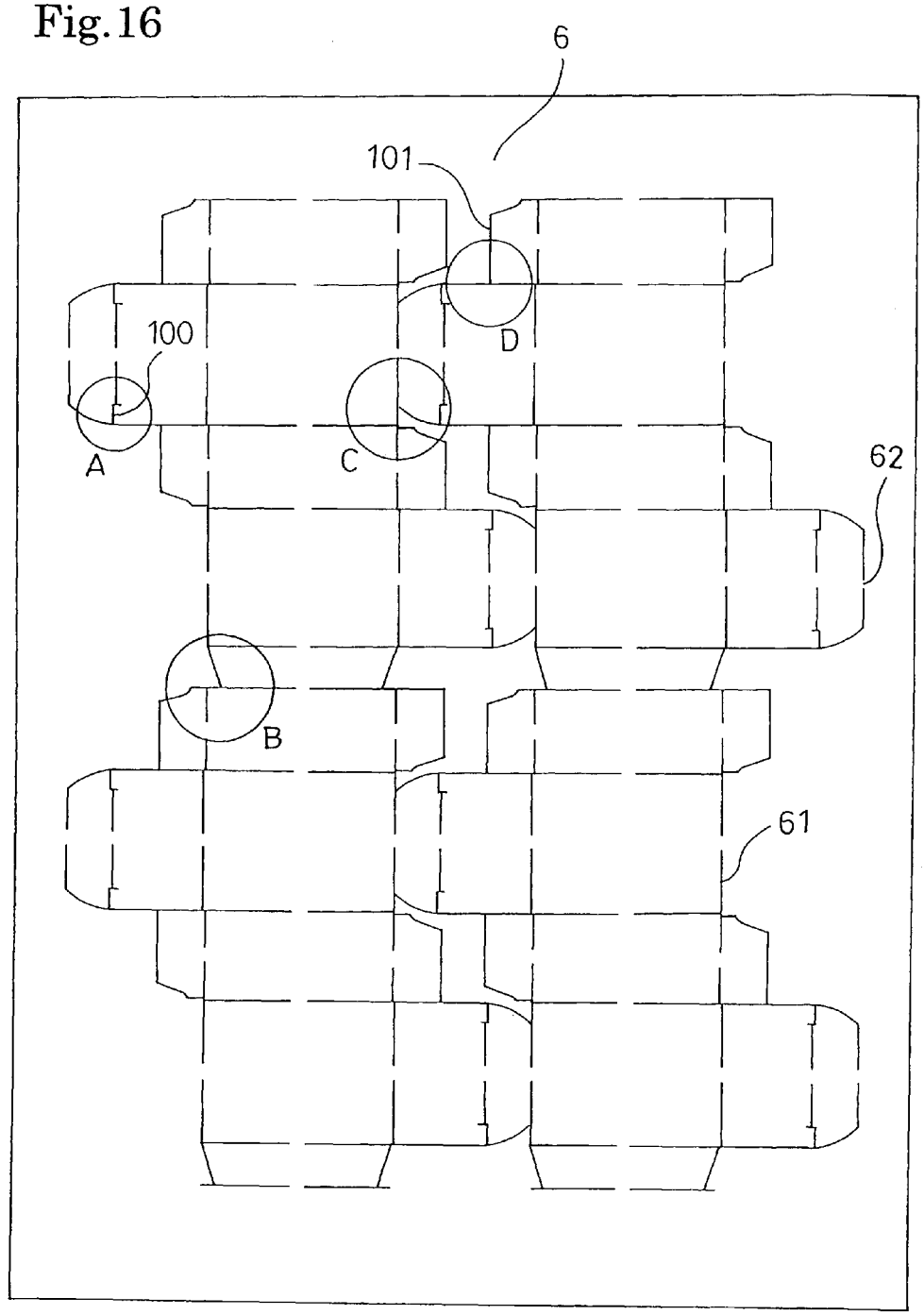
FIG. 16 is a plan view of a plywood sheet which is laser-processed into an inverted sack.

FIG. 5 shows an example of processing the terminal end of the band blade 12 for the insertion portion in the place A of FIG. 16. The grinder housing 213 approaches the band blade 12 which has been bent, and the blade is cut by the flat diamond grinder 20. The approach direction of the grinder housing 213 is automatically previously determined by a program depending on the shape so that the housing does not contact with the bent band blade 12.

In the procedure of cutting the groove 122 such as shown in FIG. 4, in the same manner as the above-described case of cutting, the Y-axis motor 21 is rotated, the grinder housing 213 is moved, the diamond grinder 20 is fed to a position corresponding to a half of the thickness of the band blade 12, the Z-axis motor 31 is then rotated to lower the Z-axis housing 313, and the groove 122 is formed in the side wall of the band blade 12 in the state of 6D of FIG. 3.

Figure 17:
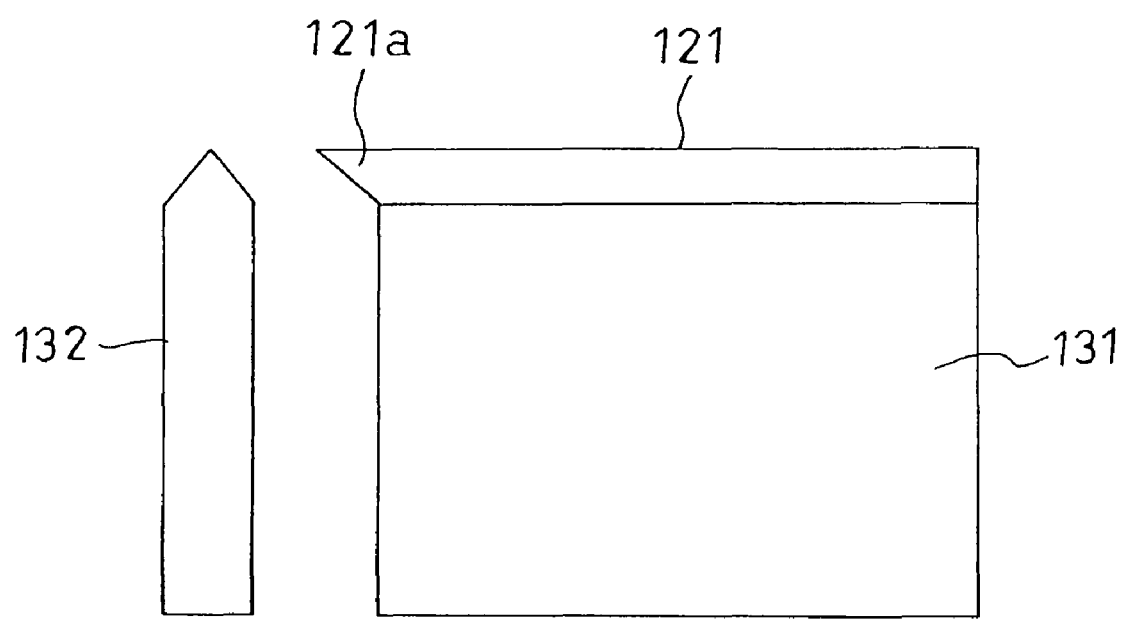
FIG. 17 is a side view showing a miter process of a punching die of a conventional example.

In the punching die of FIG. 4, in order to solve also the problem of a breakage of a miter such as in the punching die due to the miter process of FIG. 17, the groove 122 is formed in the side wall of the receiving band blade 132 at a depth corresponding to a half of the thickness of the blade 132, and a linear cut end portion 15 of the butting band blade 131 is joined to the groove 122 with perpendicularly butting thereagainst.

Figure 8A:
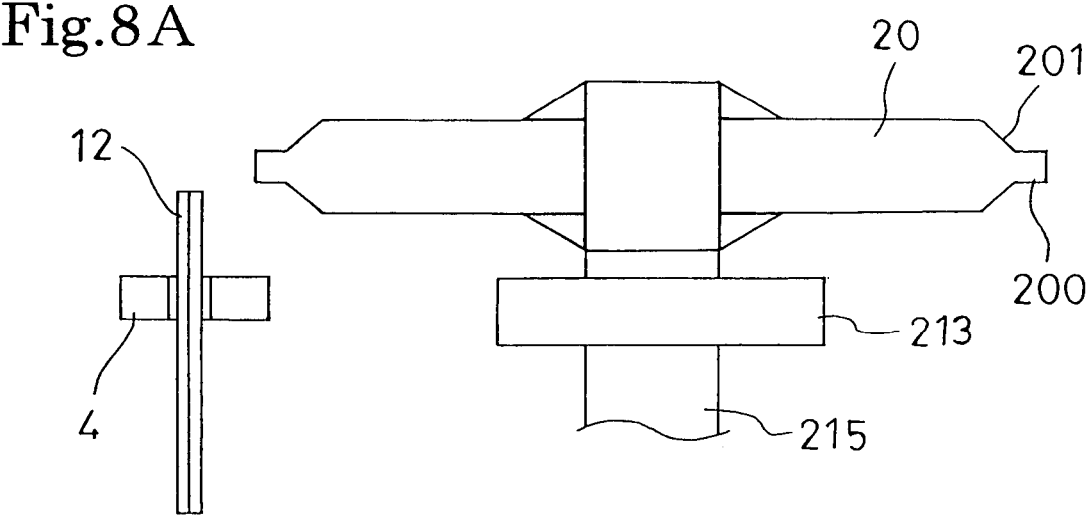
FIGS. 8(a) and 8(b) are plane views showing a process method of FIG. 7 of the invention.
Figure 8B:
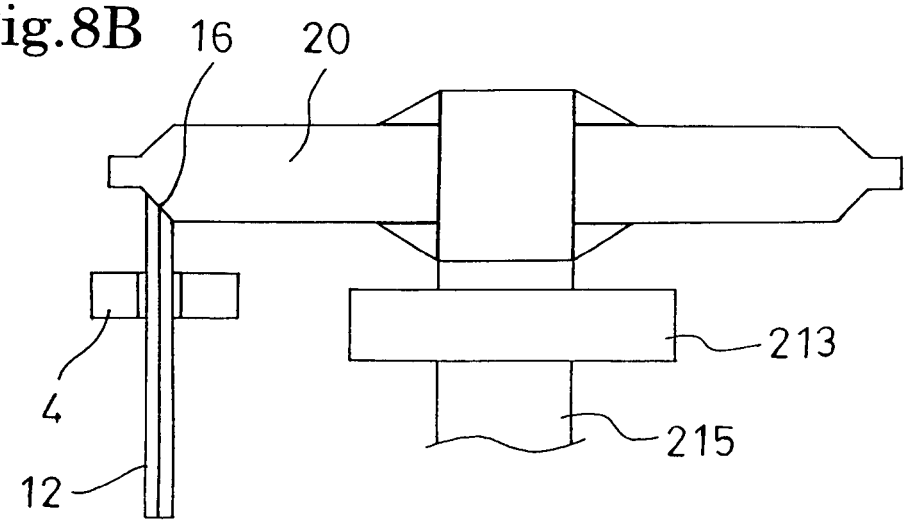

FIGS. 6(a), 6(b), 7(a), and 7(b) show other examples of the punching die. In the punching die, the end portion of the butting band blade 131 butts against the groove 122 disposed in the side wall of the receiving band blade 132 at a predetermined inclination angle, and is joined thereto. In this case, a blade inclined end 16 must be processed in an end portion of the butting band blade 131. A conventional automatic bending machine cannot perform such a process, and the blade inclined end 16 can be processed only by a manual grinder. The manual process is a highly advanced process technique which is conducted only by a skilled craftsman. By contrast, as shown in FIG. 8(a), the other diamond grinder 20 of the invention is formed into a dovetail shape where the section shape of the outer periphery has a linear portion 200 and an inclined portion 201 which is formed on the inner-diameter side end of the linear portion 200. According to the diamond grinder 20, as shown in FIG. 8(b), the blade inclined end 16 can be easily processed by approaching the inclined portion 201 of the diamond grinder 20 to the tip end of the band blade 12 by means of a program.

Figure 9B:
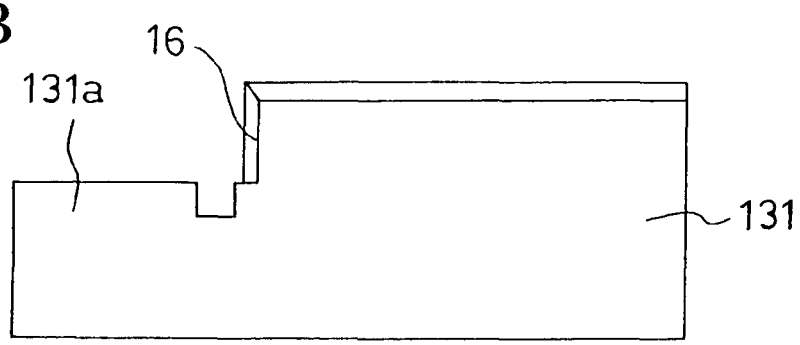
FIG. 9(b) is a side view of the butting band blade, and FIG. 9© is a side view of the receiving band blade.
Figure 9C:
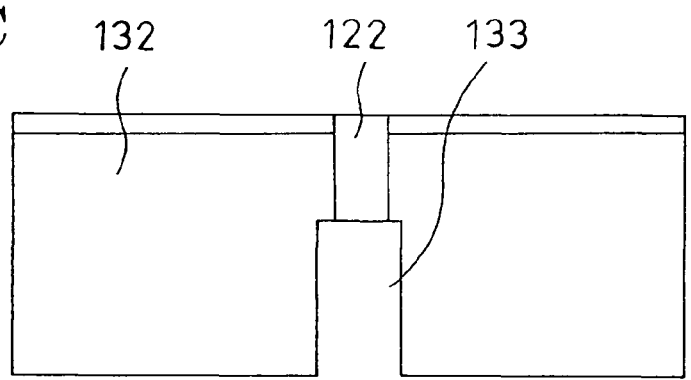

FIGS. 9(a) to 9(c) show an example of a process in which the examples of the punching die shown in FIGS. 6 and 7 are further improved. In joint portions B, C of FIG. 16, the receiving band blade 132 and the butting band blade 131 are inclinedly joined to each other, and hence paper dust is trapped in the joint portions between the blades 132, 131 during a punching work. When even a small amount of paper dust is trapped, the amount of the trapped paper dust is being increased, and the gap between the blades is enlarged. As a result, there is a case where the blades must be replaced. A method of improving this is the example shown in FIGS. 9(a) to 9(c). Namely, the example shown in FIG. 9(a) is a method in which the punching die is incorporated while an end portion 131a of the butting band blade 131 is entered below the receiving band blade 132. In the thus incorporated punching die, even when paper dust is trapped, the entered butting band blade 131 exerts a resistance, and hence the joint portions of the blades 131, 132 are not easily opened. In the method of processing the butting band blade 131, as shown in FIG. 9(b), a portion which is slightly more inward than the tip end portion of the butting band blade 131 is cut-processed by a dimension which is obtained by subtracting the thickness of the plywood sheet 6 from the height of the blade 131, by the inclined portion 201 of the diamond grinder 20 shown in FIG. 8 to form the blade inclined end 16. Thereafter, the diamond grinder 20 is once upward returned by the height of the linear portion 200. Then, the feeding roller 13 is reversely rotated to advance the processing to the end portion of the butting band blade 131. When the end portion of the butting band blade 131 is processed without performing the returning, the height is smaller than the thickness of the plywood sheet 6, but the same effect is attained. By contrast, in the processing of the receiving band blade 132, as shown in FIG. 9(c), the groove 122 which is to receive the blade inclined end 16 is cut-processed in the side wall of the receiving band blade 132, and then the state of the position 6C in FIG. 3 is formed, so that the notch 133 which enables the entering of the end portion 131a of the butting band blade 131 is processed below the groove 122. Also at this time, since the notch 133 has a large width, the feeding roller 13 is moved so that a predetermined width such as 5 mm is ensured.

The above-described example can be used also in the insertion portion in the place A of FIG. 16. Namely, the cut 100 of the insertion portion in the place A of FIG. 16 is a small blade component, and hence may drop off from the plywood sheet 6 during a punching work. Therefore, the end portion 131a of the butting band blade 131 is prolonged as shown in FIG. 9(a), and the prolonged end portion 131a is entered into the insertion portion in the place A of FIG. 16, whereby the cut is prevented from dropping off. Not only in the illustrated example, particularly, a thick blade such as that of 4 points is formed by punching out a thick material, and hence there is always a possibility that the blade drops off. Conventionally, therefore, a circular hole is opened in the body of blade, a through hole is opened in the plywood sheet 6, and a bolt is passed through, thereby preventing the blade from dropping off. In this configuration, however, the work is cumbersome. When the technique of the example is employed, the blade can be easily prevented from dropping off.

Figure 12:
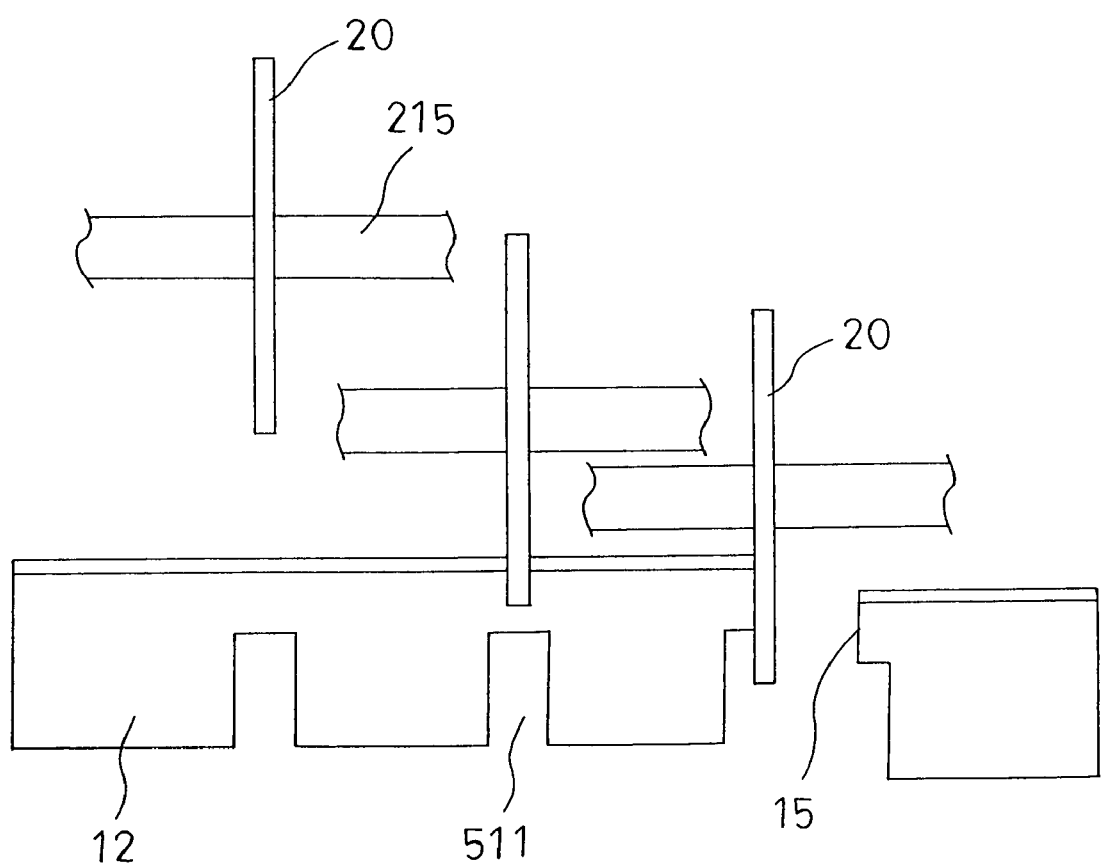
FIG. 12 is a front view showing a sequence of cutting a band blade in the invention.

In the example described above, in the notching of the blade bottom of the band blade 12, a desired width is produced by moving the feeding roller 13. When considering that this requires a prolonged time period, it may be contemplated that, as shown in FIG. 1, a bridge process apparatus 51 is disposed between the feeding roller 13 and the bending tool 1. Advantages due to the disposition of the bridge process apparatus 51 are a shortened time period, and a prolonged life period of the diamond grinder 20. In this case, also the process of cutting the both end portions of the band blade 12 is enabled by a process in which, as shown in FIG. 12, a notch 511 corresponding to the thickness of the plywood sheet is cut in a bottom portion of the band blade 12 by the bridge process apparatus 51, and the remaining portion is cut by the diamond grinder 20.

Figure 10:
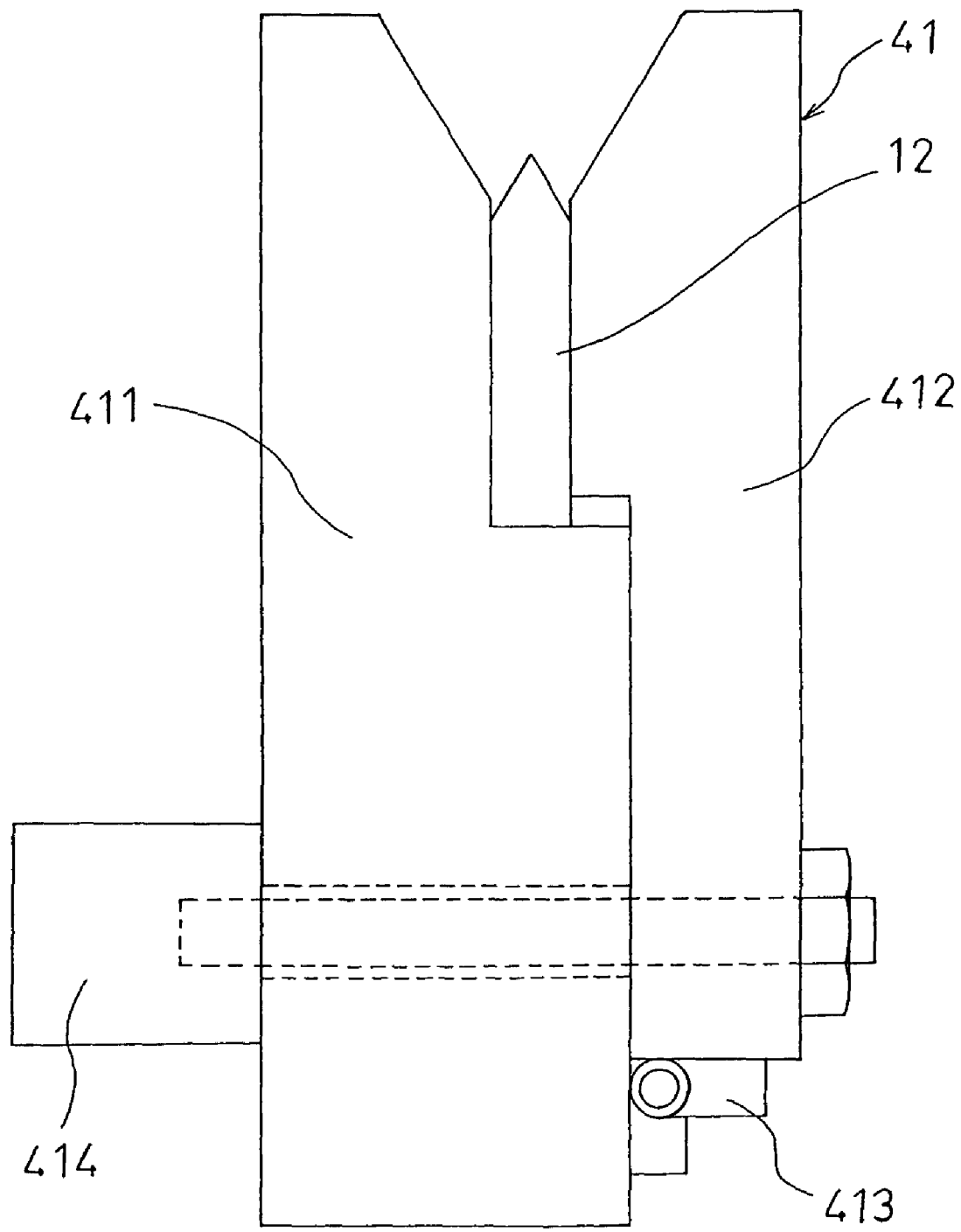
FIG. 10 is a front view of a receiving tool disposed in the automatic bending machine of the invention.

Next, the band-blade support device 4 shown in FIG. 1 will be described in detail. The band blade 12 which has been bent often vibrates as a result of the striking of the bending tool 1. In order to prevent the vibration, the band-blade support device 4 comprising the receiving tool 41 is disposed in front of the bending tool 1. In order to stop the vibration of the band blade 12 which has been bent, during a work of bending the band blade 12, the receiving tool 41 is retracted into the band-blade support device 4 so as not to impede the bending work, and, when the bending work is ended, the receiving tool 41 is raised by a motor or a pneumatic cylinder to receive the band blade 12, thereby preventing the vibration. As shown in FIG. 10, the receiving tool 41 is formed into a tuning fork-like shape, an upper portion is opened, and the width of a portion which receives the band blade 12 is equal to the thickness of the band blade 12. The receiving tool 41 is important not only for stopping the vibration of the band blade 12, but also for correctly cutting the depth (a half of the blade) of the groove 122. When deeply cut, the blade edge 121 is damaged, and, when shallow, a gap is formed in the joint portion of the band blade 12.

Figure 11:
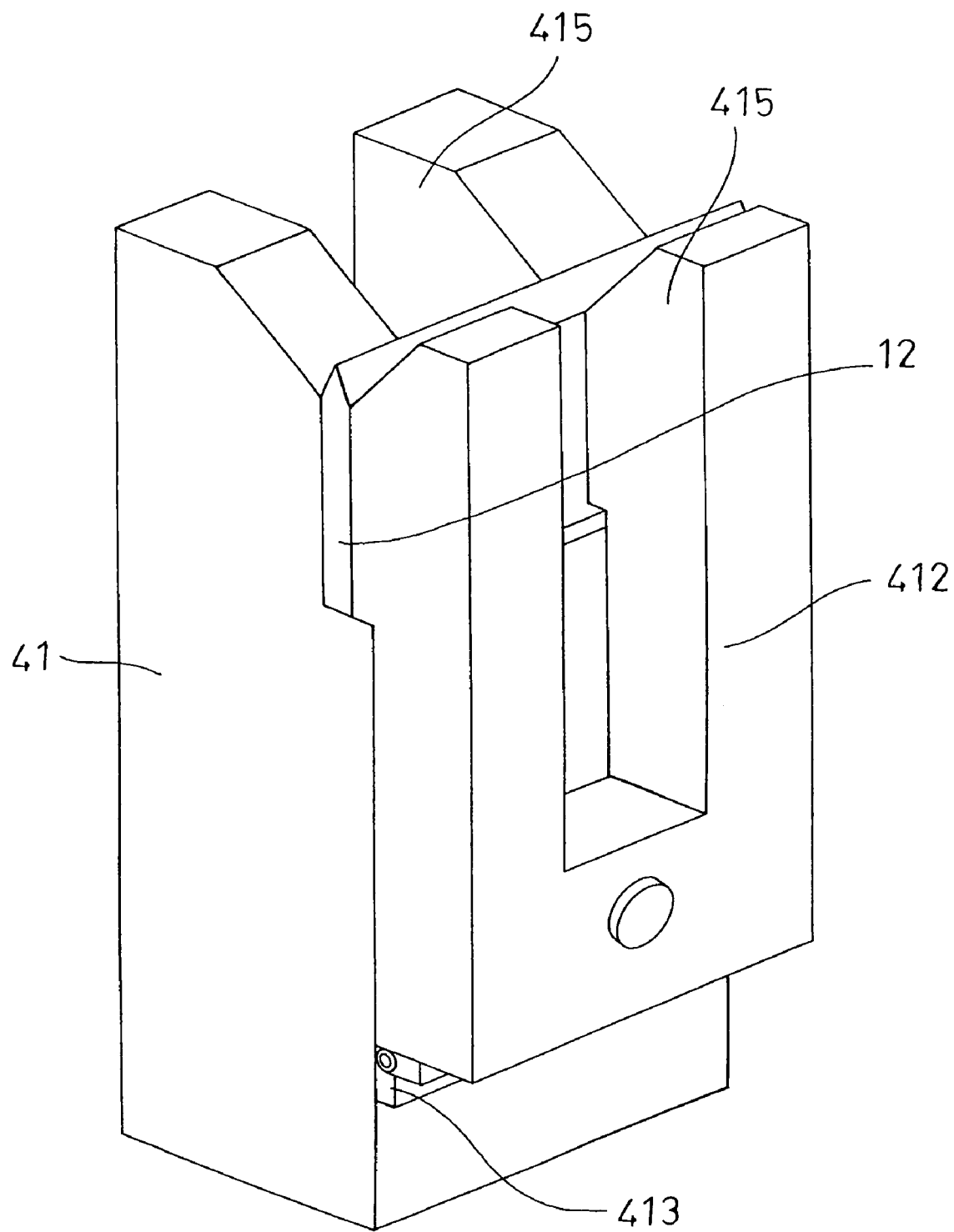
FIG. 11 is a perspective view of another receiving tool disposed in the automatic bending machine of the invention.

FIG. 10 shows the receiving tool 41 as viewed from the front, and the gap for the thickness of the band blade 12 is ensured. A left bar 411 functions as a reference, and a right bar 412 is connected in a bottom portion to the left bar 411 by a hinge 413. The both members are opened and closed by a miniature cylinder 414. When the receiving tool 41 is raised, the blade is received by the upper opening portion, and finally received by the left bar 411 and the bottom portion. The cylinder 414 functions to surely position to the left bar 411. Even when the band blade 12 is different, the band blade is pressed against the left bar 411, and hence band blades in the range from 2 points to 6 points can be correctly positioned. In the example shown in FIG. 1, the diamond grinder 20 travels between the receiving tool 41 and the bending nozzle 113. However, the invention is not restricted to this. The grinder may travel in front of the receiving tool 41. In order to more surely press the band blade 12, the receiving tool 41 shown in FIG. 11 comprises a groove 415 for assuring the band blade 12 before and after the traveling of the diamond grinder 20.

Figure 13B:
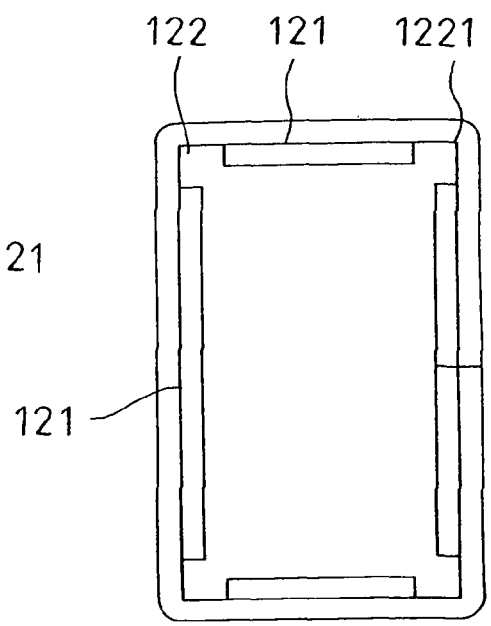
FIG. 13(b) is a plan view of the punching die.
Figure 13A:
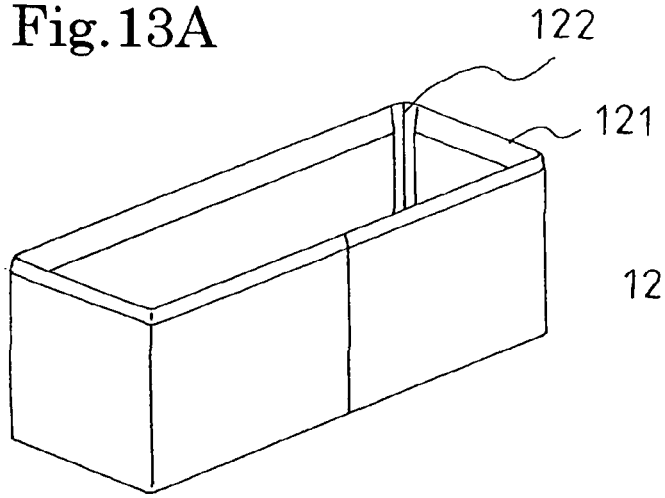
FIG. 13(a) is a perspective view showing a rectangular punching die which is produced according to the invention.

FIGS. 13(a) and 13(b) show a rectangular punching die which is produced by the automatic bending machine of the invention. Usually, when the band blade 12 is bent into a rectangular shape, an arc having a radius of 0.8 mm which is similar to the thickness is formed in the four edges in the case of the band blade 12 of 2 points (thickness of 0.72 mm). Even when an edge of 90 degree i.e., zero radius is requested, therefore, it is impossible to satisfy the request. The material inside the portions where the band blade 12 is bent is removed away, whereby a rectangular having the four edges of zero radius can be obtained. In order to realize this, the groove 122 is formed in each of places respectively corresponding to the insides of the four edges of the band blade 12, and then the places are bent. An automatic bending machine for 2 to 3 points, and that for 6 points are inevitably formed as different machines in accordance with the power of a motor. In the example, however, the band blade 12 of 6 points is reduced to a half in the portions of the grooves 122, or has the same thickness as that of 3 points. Therefore, the band blade 12 of 6 points can be bent by an automatic bending machine for 3 points.

Figure 14A:
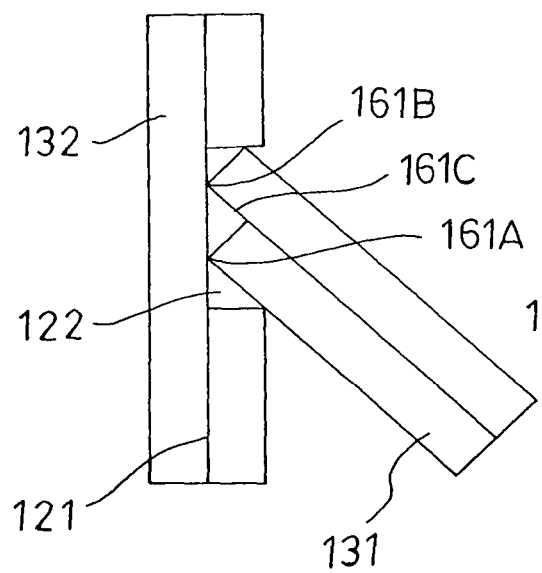
FIG. 14(a) is a plan view of a punching die in which a receiving band blade and butting band blade that are produced according to the invention are combined with each other.
Figure 14B:
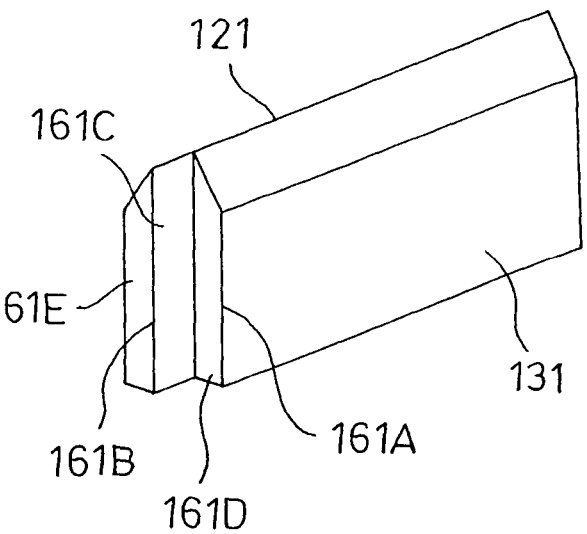
FIG. 14(b) is a perspective view of the butting band blade.

FIGS. 14(*a*) and 14(*b*) show an application example of the joint portion of the band blades of the example of FIG. 6 which are produced by the automatic bending machine of the invention. In the example of FIG. 6, the blade inclined end 16 is formed by the special diamond grinder 20 such as shown in FIG. 8. By contrast, in the present example, the end portion of the butting band blade 131 which is to be inclinedly joined to the receiving band blade 132 can be processed by the usual flat diamond grinder 20 of FIG. 5. Namely, a groove having a depth which corresponds to a half of the thickness of the band blade 131 is cut in a side wall of an end portion of the butting band blade 131, and a groove bottom face 161C and a groove side face 161D which intersects with one end of the groove bottom face 161C are formed. According to the configuration, a first edge 161A is formed at an edge where the side wall of the butting band blade 131 intersects with the groove side face 161D. Next, the other end side of the groove bottom face 161C is cut to form a projection end face 161E intersecting with the groove bottom face 161C. According to the configuration, a second edge 161B is formed at an edge where the groove bottom face 161C intersects with the projection end face 161E. Namely, the end portion of the butting band blade 131 is formed into a shape cut in a Z-like section shape having the groove bottom face 161C, the groove side face 161D which intersects with one end of the groove bottom face 161C, and the projection end face 161E which intersects with the other end face of the groove bottom face 161C.

The width of the groove bottom face 161C is determined in accordance with the joining angle between the receiving band blade 132 and the butting band blade 131. Therefore, the first and second edges 161A, 161B are joined to the groove 122 of the receiving band blade 132 in a line contact state. The blade edge 121 in the uppermost portion of the second edge 161B forms an intersection with the blade edge 121 of the receiving band blade 132. In the cases of FIGS. 6 and 7, the blade inclined end 16 of the butting band blade 131 is joined to the groove 122 of the receiving band blade 132 in a surface contact state. An advantage of the example is that, when the width of the groove bottom face 161C is changed, the joining is enabled in the line contact state at any joining angle. It is a matter of course that, when the example is combined with the example of FIG. 9, the butting band blade 131 can be entered below the receiving band blade 132.

Figure 15:
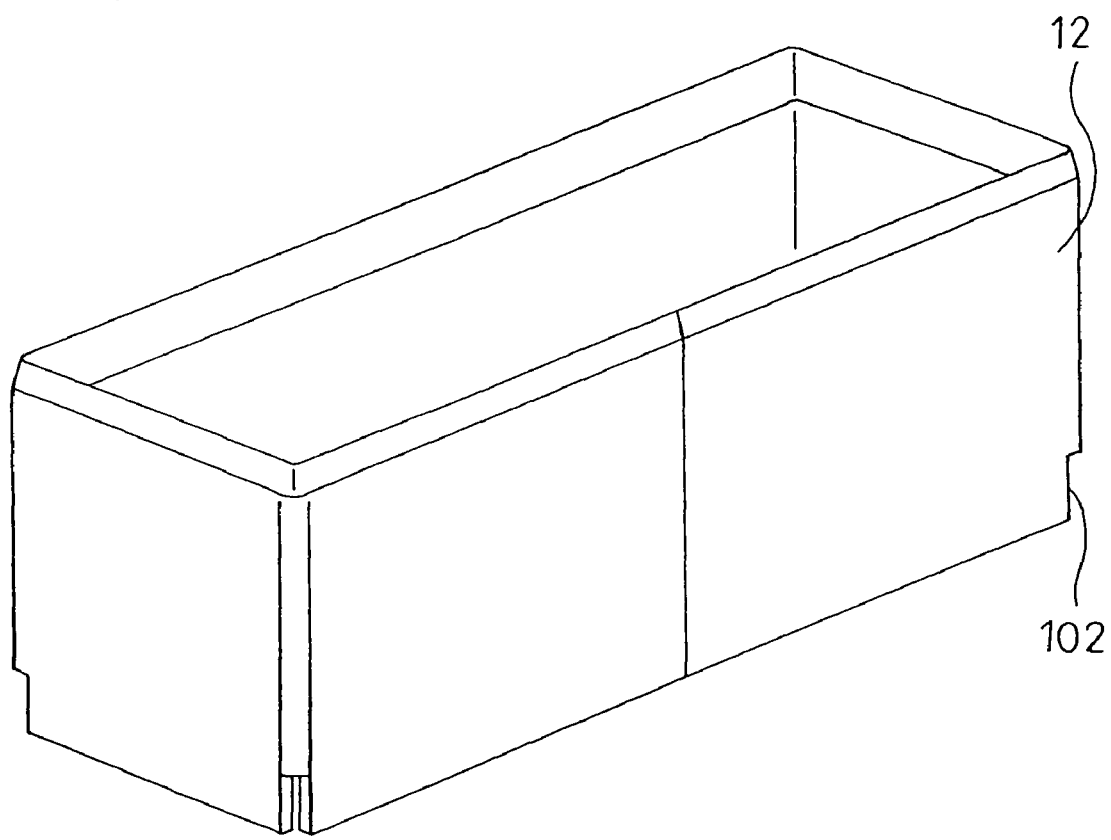
FIG. 15 is a perspective view showing another punching die according to the invention.

FIG. 15 shows a label punching die configured by bending the band blade 12 into a rectangular shape. Notches 102 are processed in places corresponding to the blade bottom portions of bend places of the band blade 12, whereby the notches 102 are formed in bottom portions of the four corners of the punching die. According to the configuration, it is possible to facilitate a "regulating" work in the punching process.

The invention claimed is:

1. An automatic bending machine for a steel rule punching die, comprising:
    a bending tool which bends a band blade into a predetermined shape, and
    a diamond grinder which is laterally and vertically moved by a computer control being disposed in front of said bending tool, said diamond grinder having an outer periphery, wherein:
    a section shape of said outer periphery of said diamond grinder is formed into a dovetail shape having a linear portion including an inner-diameter side end, and an inclined portion which is formed on said inner-diameter side end of said linear portion.

2. The automatic bending machine for a steel rule punching die according to claim 1, further comprising:
    a band-blade support device which, when said band blade is processed, is raised to hold said band blade, in front of said bending tool.

3. A steel rule punching die, comprising:
    a receiving band blade, said receiving band blade defining a side wall:
    a butting band blade, said butting band blade having an end portion, comprising a tip end and a blade inclined end:
    a groove which is cut in said side wall of said receiving band blade said groove having a lower portion; and
    a notch in said lower portion of said groove, wherein:
    said blade inclined end is received into said notch in said lower portion of said groove.

4. A steel rule punching die for operating on a band blade, the band blade being characterized as a receiving band blade and a butting band blade, the receiving band blade having a side wall and a groove cut into the side wall, the butting band blade having an end portion butting against the groove which is cut in the side wall of the receiving band blade to be joined at a predetermined inclination angle, wherein the end portion of the butting band blade is formed into a shape cut in a Z-like section shape having a groove bottom face, a groove side face which intersects with one end of said groove bottom face, and a projection end face which intersects with another end face of said groove bottom face.

5. An automatic bending machine for a steel rule punching die, for bending a band blade, comprising:
    a bending tool which bends the band blade into a predetermined shape;
    a diamond grinder disposed in front of said bending tool, which is laterally and vertically moved by a computer control; and
    a band-blade support device which, when the band blade is processed by said diamond grinder, is raised to hold the band blade in front of said bending tool, wherein:
    said band-blade support device includes a receiving tool having an upper portion, said upper portion being opened and has an openable and closable structure, so as to receive and position the band blade in front of said bending tool.

* * * * *